No. 762,161. Patented June 7, 1904.

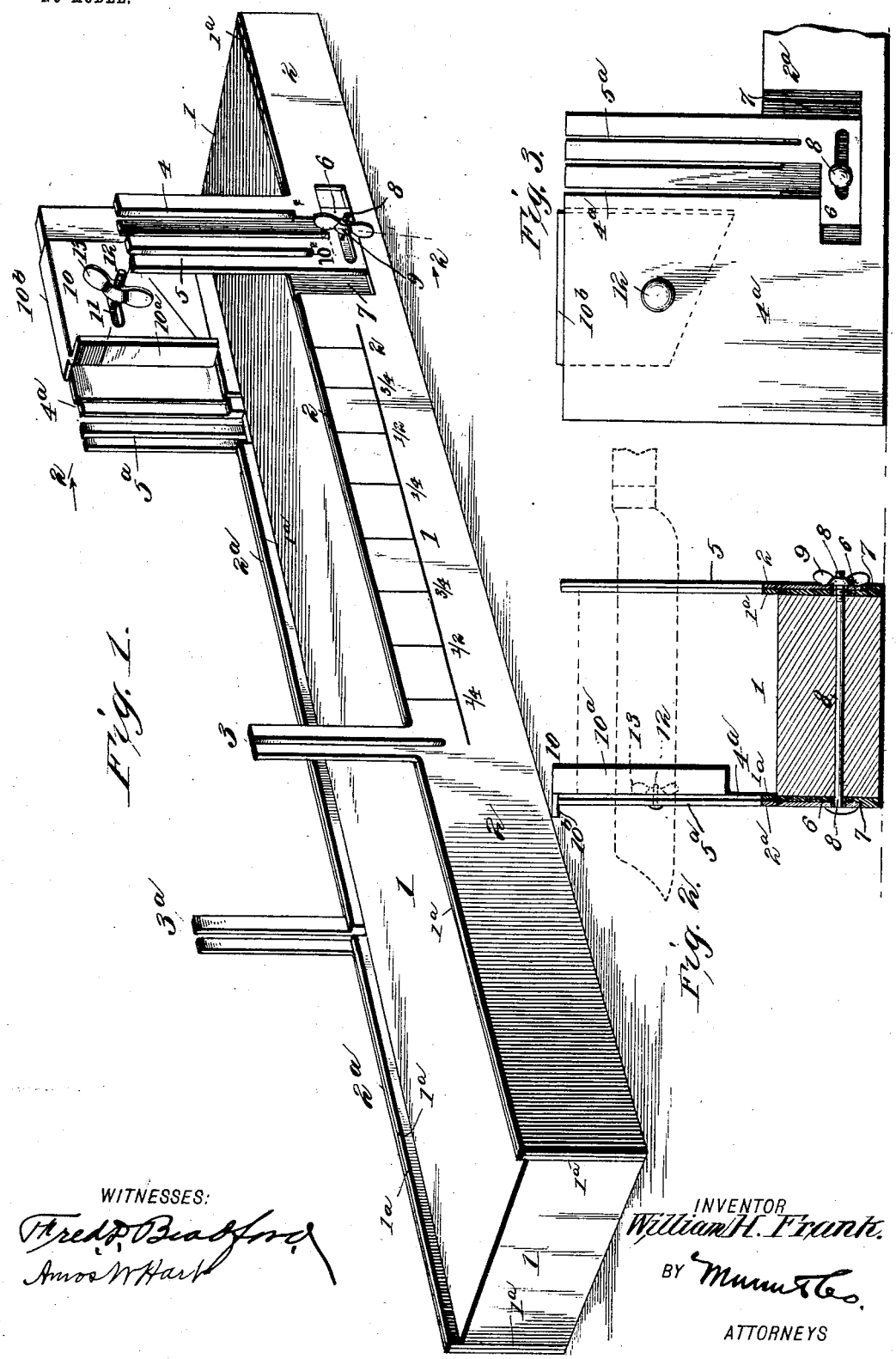

UNITED STATES PATENT OFFICE.

WILLIAM HENRY FRANK, OF BURKESVILLE, KENTUCKY.

CHEESE-GAGE.

SPECIFICATION forming part of Letters Patent No. 762,161, dated June 7, 1904.

Application filed September 17, 1903. Serial No. 173,606. (No model.)

*To all whom it may concern:*

Be it known that I, WILLIAM HENRY FRANK, a citizen of the United States, and a resident of Burkesville, in the county of Cumberland and State of Kentucky, have made certain new and useful Improvements in Cheese-Gages, of which the following is a specification.

It is the object of my invention to provide an improved apparatus by which cheese and other like commodities may be cut up into slices of a certain desired weight or size or price.

The details of construction, arrangement, and combination of parts are as hereinafter described and claimed, reference being had to the accompanying drawings, in which—

Figure 1 is a perspective view of my improved apparatus. Fig. 2 is a vertical cross-section on the line 2 2 of Fig. 1. Fig. 3 is a side view of a portion of the apparatus.

The body or base 1 of the apparatus is an elongated rectangular block, preferably formed of wood, the same having a flat top, as shown. To the sides of the base or block 1 are attached metal flanges or guides 2 and $2^a$, which project above the top of the base, as shown in Fig. 1. Additional side plates $1^a$ may be employed, if desired, the same being arranged between the plates 2 $2^a$ and the base 1, as shown. Such projecting portions serve as guides for the cheese or other commodity, which is placed upon the base 1 and slid along the same. A little in rear of the middle of the length of the base 1 the side pieces 2 and $2^a$, which are preferably constructed of metal, are provided, respectively, with vertical extensions 3 and $3^a$, consisting of arms arranged parallel and separated by a narrow vertical slot, which is adapted to receive a knife and to guide the same transversely in the operation of severing a slice from the cheese. On the right of the knife-guides 3 the side piece 2 is provided with a scale or graduations which are marked in fractional subdivisions indicating weights extending from one-fourth pound to two pounds. In other words, each of the vertical lines or graduations indicates a one-fourth pound, the amount increasing from left to right. It will be understood that a piece of cheese being laid upon the base 1 at the left of the knife-guides 3 $3^a$ will be pushed along to the right beyond the guides, the distance varying according to the size or weight of the slice which is to be severed. Thus if the cheese projects to the right so that its edge is adjacent to the graduation "one-fourth" that will indicate that if a knife be applied between the slotted guides 3 $3^a$ a slice weighing one-fourth pound will be severed, and so on for the other graduations and numerals indicating increasing weights. The guides and the scale described are designed for use in cutting up and slicing cheese having any desired quality and varying in price accordingly.

Adjacent to the right-hand end of the base 1 I provide means for gaging the size of slices according to price. Thus the side pieces 2 and $2^a$ are provided with vertical knife-guides 4 and $4^a$, which are fixed in position, and adjacent thereto on the left I provide movable knife-guides 5 and $5^a$—that is to say, the guides 5 and $5^a$ are adjustable bodily toward and from the end of the base 1. For this purpose they are provided with a horizontally-extended base portion 6, (see Figs. 1 and 3,) which is slotted lengthwise, and a screw-rod 8 passes through them and the base 1, a wing-nut 9 being applied to one end of the same for the purpose of enabling the guides 5 and $5^a$ to be clamped in any position to which they may be adjusted. It is apparent that such adjustment may be easily effected by simply loosening the nut 9, which will permit the guides to be slid in either direction. The side plates 2 and $2^a$ are cut out or recessed at 7, as shown in Figs. 1 and 2, to receive the slotted bases 6 of the movable guides 5 $5^a$. The lower edges of the recesses are horizontal and serve as straight-edge guides for the part 6. One of the knife-guides $4^a$ is extended to the end of the base 1 and is practically a rectangular plate of considerable dimensions. Upon this I arrange a support and stop 10, which consists of a metal plate having a vertical flange $10^a$ extending transversely from its inner edge, and a top flange $10^b$, which rests upon the guide. The stop-plate 10 is provided with a lengthwise slot 11 and a screw-rod 12, having a nut 13 passing through the same and through the support and guide 4ª. It is apparent that by this means the stop 10 may be adjusted toward or from the knife-guide 4 4ª, as may be required to vary the thickness of a slice to be severed from the body of the cheese. At the base of the guides 4 and 5 are inscribed "5ᶜ" and "10ᶜ," which indicate, respectively, five cents and ten cents. If it be desired to cut a slice which is worth five cents, the stop 10 will be adjusted the required distance from the fixed guides 4 and 4ª, and it is obvious that this distance will vary according to the quality and value of the cheese. If, on the other hand, it be desired to sell a slice worth ten cents, the movable guides 5 and 5ª will be adjusted at a correspondingly greater distance from the stop 10. The adjustable knife-guides are adapted to slide on or over the fixed guides, the latter being thinned or cut away, as shown, to permit this arrangement.

As shown in Fig. 1, the right-hand side piece or guide 2 is cut away at the right-hand end, so that its top is flush with the base 1. This construction enables the cheese slices to be easily slid off and removed at the corner of the apparatus.

My improved apparatus is thus adapted for use in slicing and selling cheese in different quantities and at different values and will greatly economize the time and labor of the grocer.

It is of course preferable that the cheese should be made up in elongated blocks rectangular in form; but this is not a necessity, since the ordinary circular cheese may be cut up into sections or blocks of such form and proportions as will adapt them to be sliced by aid of my apparatus.

To prevent the cheese as it passes through the base 1 from striking the guides 3 3ª, 4 4ª, and 5 and 5ª, I provide strips 1ª, overlying the base 1 and extending longitudinally along the same, just within the upwardly-projecting portions of the side pieces 2 2ª.

What I claim is—

1. The improved cheese-gage comprising an elongated flat base, a stop which is adjustable toward and from the adjacent end of the base, and means for supporting and clamping the stop, adjacent fixed knife-guides arranged vertical, adjustable knife-guides arranged on the side of the fixed guides farthest from the stop, and the screw-rod and clamp-nut for clamping the adjustable guides to the base, substantially as described.

2. In a cheese-gage, the combination with a longitudinal base having side plates provided with lateral recesses 7, of movable knife-guides arranged and adapted to slide in said recesses and means for securing them in any desired adjustment, substantially as described.

3. In a cheese-gage, the combination, with the flat top base, vertical knife-guides, and a vertical support secured to the side of the same, of a stop consisting of a plate having a lateral vertical flange and a top flange adapted to rest and slide upon the support, and means for clamping the stop in any desired adjustment, substantially as described.

4. The combination with the elongated base having vertical fixed knife-guides arranged oppositely, and adjustable knife-guides arranged adjacent and adapted to slide over the fixed guides, and means for clamping the adjustable guides in any desired position, as shown.

WILLIAM HENRY FRANK.

Witnesses:
 GROVER AKIN,
 WILLIAM BASS.